March 3, 1936. S. ISENBERG 2,032,483
INSERT FOR CONFECTION MOLDS
Filed Sept. 16, 1933
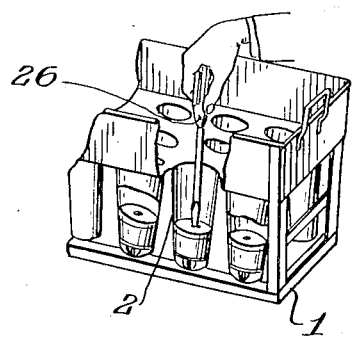
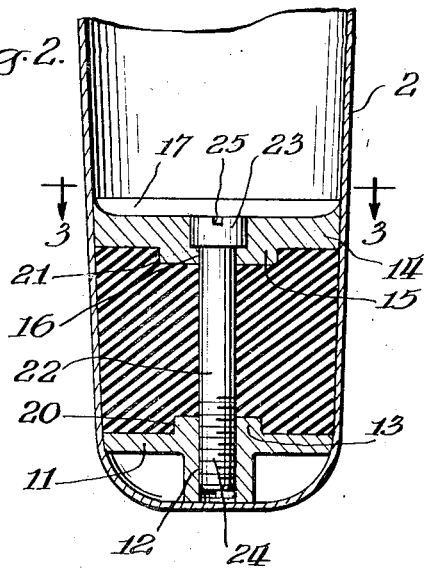
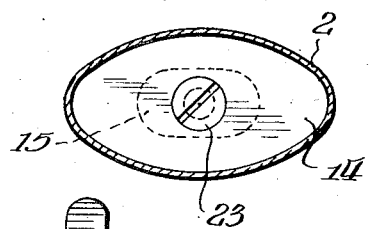
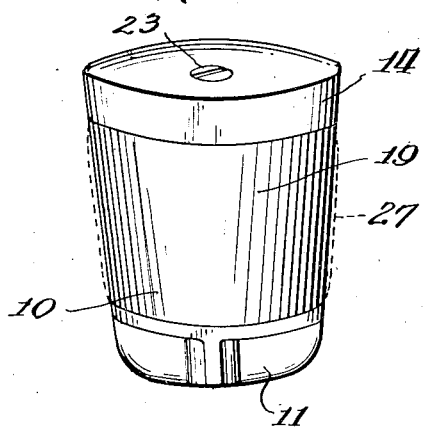
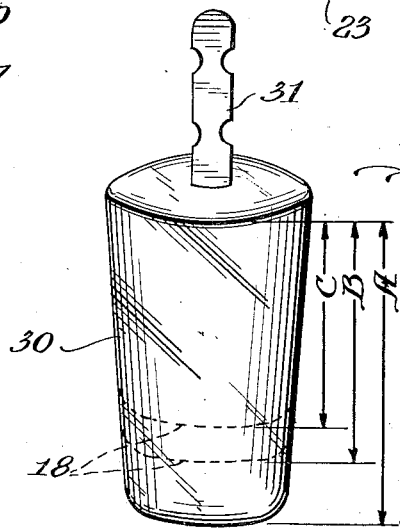
Inventor
Stanley Isenberg
By Maurice S. Cayne
Atty.

Patented Mar. 3, 1936

2,032,483

UNITED STATES PATENT OFFICE 2,032,483

INSERT FOR CONFECTION MOLDS

Stanley Isenberg, Chicago, Ill.

Application September 16, 1933, Serial No. 689,723

1 Claim. (Cl. 107—19)

This invention relates generally to molds, such, for example, as confection molds or the like, and more particularly to a novel and improved removable insert, whereby the same mold may be adapted for the manufacture of a product of different sizes.

In the manufacture of such products as frozen confections, or the like, the size of the product generally depends upon the nature of the confection. Thus when the confection is in the form of a frozen sucker, which consists of a mixture of water and syrup, the same is of a relatively large size, whereas when the confection is in the form of an ice cream block or a block of frozen custard the same is considerably smaller as the cost of the ingredients which go into the manufacture of these products is considerably different. Heretofore, therefore, in the manufacture of these various types of confections it was necessary for the manufacturer to have a number of molds of different sizes for the manufacture of these various types of frozen confections. This, of course, involved an outlay of a considerable amount of money for the various sizes of molds as well as involving the taking up of space, etc., for the storing and housing of these different molds.

It is, therefore, the main object of this invention to provide a novel and improved sanitary insert which may be readily inserted and removed from a confection mold to adapt the same for the manufacture of confections of different sizes. In designing an insert of this character it is necessary to make the same so that it may be readily disposed within the mold to reduce the size thereof, and when in such position, it should prevent leakage of the ingredients to the bottom of the mold, should also be highly sanitary, and should at the same time be durable and easily removed from the mold when it is desired to replace the same or to entirely remove the same.

It is another object of this invention to produce an insert of the character described having all of the above advantages and one that may be readily inserted into and removed from the mold with a minimum of labor and time and without the need of any equipment other than an ordinary screw driver, and which when once disposed in position will be highly sanitary and will also produce a confection of reduced size, the general configuration of which will be substantially the same as the confection produced in the unobstructed mold.

It is a further object of this invention to provide a device of the character described comprising a pair of non-yielding members formed of suitable material, such as die cast aluminum, or the like, and between which is disposed in assembled position a solid piece of yielding material, such as soft rubber, or the like, all of said parts being assembled by means of a screw extending therethrough, the head of the screw being received in the upper of said non-yielding members and the lower threaded portion of said screw being received in threaded relation with the lower of said members, whereby actuation of said screw in the proper direction will effect a compressing action on the intermediate body of rubber causing the same to expand to grip the inner perimeter of the mold, which gripping action will securely lock the insert within the mold.

A still further object of this invention is to provide a device of the character described comprising a pair of non-yielding members between which is disposed a solid body of yielding material, all of said members being assembled by means of a centrally disposed screw extending through said members, said screw having the lower threaded portion thereof engaged within a threaded socket provided in one of said members, whereby the actuation of said screw will cause said non-yielding members to move towards or away from each other, said non-yielding members being adapted for a snug fit within the mold, and when moved towards each other by the actuation of the screw will compress the yielding member to cause the same to expand and to thereby grip the inner perimeter of the mold to securely lock the insert in operative position.

A still further object of this invention is to provide a device of the character described, which will be simple in construction, assembly and operation, which will be sanitary and durable, which may be produced along lines convenient for low cost manufacture, and which will be highly efficient for carrying out the purposes for which it is designed.

With the foregoing and other objects in view, which will appear as the description proceeds, the invention consists in certain novel features of construction, arrangement and combination of parts hereinafter more fully described, illustrated in the accompanying drawing, and particularly pointed out in the appended claim, it being understood that various changes in form, proportion, size and minor details of the structure may be made without departing from the spirit or sacrificing any of the advantages of the invention.

For the purpose of facilitating an understanding of my invention, I have illustrated in the accompanying drawing an improved embodiment thereof, from an inspection of which, when considered in connection with the following description, my invention, its mode of construction, assembly and operation, and many of its advantages should be readily understood and appreciated.

Referring to the drawing in which the same characters of reference are employed to indicate corresponding or similar parts throughout the several figures of the drawing:

Figure 1 is a view in perspective of a portion of a multiple confection mold showing a plurality of my improved inserts disposed in place in the individual confection molds;

Fig. 2 is a sectional view through the bottom portion of an individual mold showing my improved insert in operative position in place therein;

Fig. 3 is a top plan view taken on line 3—3 of Fig. 2;

Fig. 4 is a view in perspective of my improved insert, the same being shown in dotted lines in expanded position; and Fig. 5 is a view in perspective of the confection produced with said molds, the dotted lines thereon illustrating the different sizes of confections that may be produced with said mold when employing my improved insert.

Referring to the drawing more specifically by characters of reference, the numeral 1 designates a confection mold within which are provided a plurality of individual molds 2, which molds are employed for making frozen confections of the type illustrated in Fig. 5. As already explained, when it is desired to make a confection consisting of the ingredients of water and syrup, the unobstructed mold is employed producing a confection of comparatively large size as shown at A in Fig. 5.

However, when the confection is to be made of ice cream or in the form of frozen custard, the same is to be of a smaller size, such, for example, as the size illustrated at B or C in Fig. 5, and to produce that size it is necessary to insert in the individual mold 2 my improved insert 10, whereby the said mold may be reduced for producing a confection of the desired size. As the specific construction of mold per se forms no part of the present invention, it is not thought necessary to describe the same in more detail.

My improved insert, which is generally designated by the reference character 10, comprises in the embodiment illustrated a lower member 11, which is shaped as shown in the drawing and is adapted to snugly fit the lower portion of the mold 2. This member 11 may be formed of any suitable material, such, for example, as die cast aluminum, or the like, and is provided with a central passage or threaded bore 12 and has formed on its upper face a central projection 13 for the purpose to be presently more fully described.

Co-operating with said lower member 11 is a second member 14 which is also formed of suitable material, such as die cast aluminum, or the like, and which is shaped so as to snugly fit the interior of the mold at the point where the same contacts the mold when the insert is in operative position. The member 14 is provided on its lower face with a depending central projection 15 and a central passage 16, which passage is of reduced diameter adjacent the lower portion thereof.

The upper face of the member 14 is hollowed out, as shown at 17, to give to the confection formed within the obstructed mold the desired bottom configuration as shown by dotted lines at 18 in Fig. 5.

Mounted between the members 11 and 14 is a solid piece of yielding material 19, such, for example, as soft rubber, or the like, said member 19 being provided on its upper and lower faces with the depressions 20 and 21, respectively, for receiving therein the projections 13 and 15, respectively. The members 11, 14 and 19 are assembled in operative position by means of the screw 22 extending therethrough, said screw being provided with the head 23 which is of enlarged diameter and which is received in the central opening 16 provided in the member 14. The lower portion of the screw is threaded, as shown at 24, and is adapted for being received in threaded engagement within the threaded opening 12 of the member 11. A suitable recess 25 is provided in the upper face of the head 23 of the screw for receiving a screw driver, or the like, 26 by means of which the said screw 22 may be actuated. The head of the screw 23 is received in the opening 16, so that the upper surface thereof will be flush with the upper surface 17 of the member 14.

From the above it will be apparent that the actuation of the screw 22 will cause the members 11 and 14 to move either towards each other or away from each other depending upon the direction of rotation of the screw. Thus the screw 22 may be actuated to move the members 11 and 14 away from each other and to thereby release any pressure on the intermediate body of rubber 19.

When in this position it will be apparent that the insert may be readily dropped into or removed from the mold 2 as it does not press on the inner perimeter of the mold. However, when the screw 22 is actuated to move the members 11 and 14 towards each other the body 19 of rubber will be compressed between said members and will cause the same to expand at the sides to the position indicated at 27 by dotted lines in Fig. 4, in which position it will be readily apparent that said body of rubber will grip the inner perimeter of the mold and to thereby become securely locked in place therein. When in this position, the insert will fit sufficiently snug within the lower portion of the mold to prevent the leakage of any of the liquid past the same.

It will also be apparent that by employing these inserts it will be necessary for the manufacturer to have only one size of mold with which he will be able to produce confections of different sizes. These molds are generally used at the present time in the manufacture of frozen confections on sticks, the confection 30 having the stick 31 embedded therein being an illustration of the type of confection produced with the use of these molds. As already explained, the smaller one, indicated by the letter C, may be an ice cream block or a confection of frozen custard, whereas the larger one, indicated by the letter A, may be a frozen sucker made up of water and syrup. It will also be understood that I do not limit myself to the particular shape of mold and insert shown, as the principle involved may be readily employed with satisfactory results on any shape or type of mold.

It is believed that my invention, its mode of construction and assembly and operation, and many of its advantages should be readily understood from the foregoing without further description, and should also be manifest that while a preferred embodiment of the invention has been shown and described for illustrative purposes, the structural details are, nevertheless, capable of wide variation within the purview of my invention as defined in the appended claim.

What I claim and desire to secure by Letters Patent of the United States is:

In combination with a mold, of an insert adapted for disposition within the same for reducing the size thereof, said insert being adapted for completely filling the lower portion of said mold and being effective when in operative position for preventing leakage past said insert to the lower portion of the mold, the upper portion of the mold when the insert is in place being unobstructed thereby producing a molded article of substantially the same configuration but of a smaller size than the one produced in the original mold.

STANLEY ISENBERG.